(12) United States Patent
Wolf et al.

(10) Patent No.: US 6,363,613 B1
(45) Date of Patent: Apr. 2, 2002

(54) TORSION BAR SHOULDER BEARING

(75) Inventors: Franz Josef Wolf; Uwe Schleinitz, both of Bad Soden Salmunster; Peter Koczar, Am Roten Berg, all of (DE)

(73) Assignee: WOCO Franz-Josef Wolf & Co., Bad Soden-Salmunster (DE)

( * ) Notice: Subject to any disclaimer, the term of this patent is extended or adjusted under 35 U.S.C. 154(b) by 0 days.

(21) Appl. No.: 09/560,952

(22) Filed: Apr. 28, 2000

(30) Foreign Application Priority Data

Apr. 29, 1999 (DE) .......................................... 199 19 573

(51) Int. Cl.$^7$ ................................................ B21F 35/00
(52) U.S. Cl. ................................ 29/896.91; 29/896.93; 267/141.2; 267/293
(58) Field of Search .............................. 29/898, 898.13, 29/527.2, 527.3, 458, 898.11, 898.12, 898.058, 898.059, 527.1, 896.91, 896.93; 264/297.2; 267/140.4, 140.2, 141.2, 141.3, 292, 293

(56) References Cited

U.S. PATENT DOCUMENTS

| | | | | |
|---|---|---|---|---|
| 2,346,574 A | * | 4/1944 | Guy ............................. | 287/85 |
| 2,374,747 A | * | 5/1945 | Hardy .................... | 29/898.059 |
| 2,390,160 A | * | 12/1945 | Marvin .................... | 29/898.059 |
| 3,698,703 A | * | 10/1972 | Hipsher ..................... | 267/63 |
| 3,769,691 A | * | 11/1973 | Puzik .......................... | 29/523 |
| 3,880,970 A | * | 4/1975 | Dinzburg et al. ............. | 264/54 |
| 3,897,190 A | * | 7/1975 | Binzburg et al. ............ | 425/383 |
| 4,013,101 A | * | 3/1977 | Logan et al. ................ | 138/130 |
| 4,106,967 A | * | 8/1978 | Logan et al. ................ | 156/184 |
| 4,705,410 A | * | 11/1987 | von Broock ................. | 384/99 |
| 4,971,456 A | * | 11/1990 | Hori ............................. | 384/99 |
| 5,271,678 A | * | 12/1993 | Bourgeot ..................... | 384/221 |
| 5,489,087 A | * | 2/1996 | Bitschkus .................... | 267/141 |
| 5,537,746 A | * | 7/1996 | Narkon .................. | 29/898.066 |
| 5,613,668 A | * | 3/1997 | Brunerye ..................... | 267/219 |
| 5,743,015 A | * | 4/1998 | Kunze et al. ............ | 29/898.07 |
| 6,094,818 A | * | 8/2000 | Ogawa et al. ........... | 29/896.93 |
| 6,125,539 A | * | 10/2000 | Ogawa et al. ........... | 29/896.93 |
| 6,141,853 A | * | 11/2000 | O'Donnell .................... | 29/446 |

* cited by examiner

*Primary Examiner*—S. Thomas Hughes
*Assistant Examiner*—Marc W. Butler
(74) *Attorney, Agent, or Firm*—Arthur G. Yeager

(57) ABSTRACT

The method for manufacturing a torsion bar shoulder bearing has four method steps: (1) the manufacture of a elastomeric spring as a not fully vulcanized molding for receiving a sleeve-shaped or bolt-shaped inner connecting part in a central bore and an outer sleeve-shaped connecting element; (2) the pretreatment of the surface regions, to be connected to the molding, of the connecting parts by means of an adhesive system; (3) the pushing of the molding onto the inner connecting part and the insertion of the molding thus reinforced into the outer connecting part (or in the opposite sequence), as a result of which the elastomeric molding is clamped under moderate prestress between the two connecting parts, and (4) the concluding full vulcanization of the elastomeric molding in the assembled bearing, using a tempering furnace, at temperatures of below 140 to 150° C.

20 Claims, 1 Drawing Sheet

TORSION BAR SHOULDER BEARING

CROSS-REFERENCE TO RELATED APPLICATIONS

Not Applicable

STATEMENT REGARDING FEDERALLY SPONSORED RESEARCH OR DEVELOPMENT

Not Applicable

MICROFICHE APPENDIX

Not Applicable

BACKGROUND OF THE INVENTION

1. Field of the Invention

Figure 1:
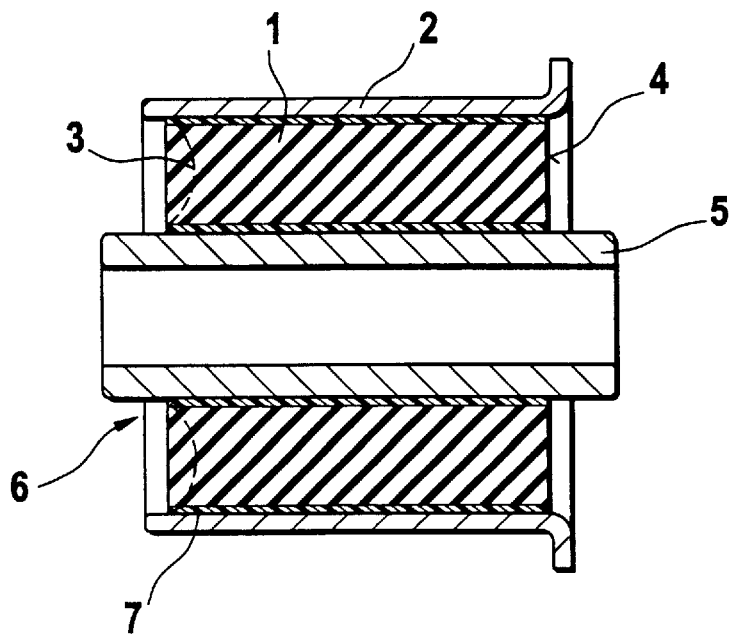

The invention relates to a bearing of the type mentioned in the precharacterizing clause of patent claim 1.

Stabilizing torsion bars are torsion spring bars, used in motor vehicle construction, which serve for stabilizing against tilt and torsion of the body when a motor vehicle is cornering. Such stabilizing torsion bars, referred to below in brief as"torsion bar", extend, as a rule, over the entire width of the vehicle and are arranged in the region of the front axle and in the region of the rear axle, that is to say with two such torsion bars for each vehicle. Such torsion bars for tilt stabilization are therefore relatively large structural parts with a clear longitudinal extent of the order of magnitude of around 1.5 m.

In motor vehicle construction, such stabilizing torsion bars cannot be screwed, for example positively screwed or riveted, metal-on-metal to the chassis, on the one hand, and to the body, on the other hand. If such a type of fastening were adopted, they would transmit all the wheel noises and road noises, via the solid-borne sound bridges thus formed, to the body and therefore also to and into the passenger cell. The torsion bars must therefore be arranged so as to be mounted in an uncoupling, at least insulating manner, in order to prevent the described conduction of solid-borne sound. For this purpose, sleeve bearings have been used on the torsion bar shoulders for many decades. Such sleeve bearings have typically a rigid outer sleeve and, coaxially in the latter, a rigid inner sleeve, sometimes also an inner bolt, and also an elastomeric packing, more precisely an elastomeric buffer, which connects to one another the two rigid sleeves lying one in the other and separates the two sleeves acoustically from one another. In this case, this interruption of the solid-borne sound bridge also separates the connecting elements of the chassis and of the body, said connecting elements in each case engaging on one of the two sleeves of the sleeve bearing which lie one in the other. In this context, the body may be connected, for example via a screw bolt, to the inner sleeve and the torsion bar may be connected via a connecting lug or a bearing shell. Alternatively, the torsion bar shoulder serves as an inner bolt and is connected via an inner sleeve to the uncoupling elastomer of the sleeve bearing, whilst the outer sleeve or else, directly, the outer cylindrical surface of the rubber sleeve is connected to the body via a bearing shell. In particular, innumerable arrangements for these connections are known from the commonly accepted prior art, but do not alter the basic function of such a torsion bar bearing.

Both in large heavy commercial vehicles and in passenger cars driven at higher speeds, considerable forces occur on such torsion bar bearings, specifically both rotational forces and translational forces. In such cases, these forces, which occur unavoidably as a consequence of functioning, have to be absorbed solely by the rubber packing and the tying of the latter to the two connecting elements of the sleeve bearing, specifically the inner sleeve and outer sleeve. The use of structural elements making a positive connection, such as, for example, the use of disks or of bolts passing through the connecting elements, is not possible, since such structural elements stabilizing the sleeve bearing would produce solid-borne sound bridges which would nullify the intended function of interrupting the solid-borne sound path, which is precisely the reason for the bearing.

The development of torsion bar bearings must accordingly concentrate on providing the best possible nonpositive, integral or positive connection of the elastomeric packing to the inner sleeve or the inner bolt and the outer sleeve or the externally adjoining bearing shell or bearing block shell, said connection being capable of absorbing the high translational and rotational dynamic forces which occur. If the connecting elements are not tied to the elastomeric sleeve in such a permanently dynamically fixed way, a dynamic load on the bearing results in frictional noises and in creaking due to relative movements between the elastomeric block and the connecting element, such noises and creaking being disturbingly audible right into the passenger cell of the motor vehicle. Moreover, such relative movements between the connecting elements and the uncoupling elastomeric buffer cause appreciable wear both of the elastomer and, in particular, of the inner connecting element. In addition to the disturbing noises produced, therefore, wear of the structural elements of the sleeve bearing and consequently a reduction in the service life of the bearing come about.

2. Description of the Related Art

Researchers have been working for more than half a century on a satisfactory solution to this technical problem, not only for torsion bar bearings, but also for related sleeve bearings with a similar bearing function. In this context, many of the known solution proposals amount merely to generating the highest possible prestress for the rubber sleeve of the bearing, in order thereby to improve permanently the frictional connection between the inner and outer axial surfaces of the rubber sleeve and the connecting elements. One example of such attempts at solving the problem is known from the American Patent U.S. Pat. No. 2,346,574 of 1942 and from the German preliminary publication DE 16 25 561 A1, Austrian Patent AT 357 882 A or, more recently, European preliminary publication EP 893 291 A1. At the same time, it is likewise already known, for example from the last-mentioned European Patent Specification EP 893 291 A1, to improve the frictional connection between the elastomeric sleeve and the connecting elements by additional adhesive bonding.

Furthermore, it is also known from the commonly accepted prior art to insert the bearing portion of the torsion bar directly into a die and to vulcanize the elastomeric sleeve directly onto the torsion bar. In this method, a torsion bar bearing constructed in this way initially has good bonding properties, at least on the torsion-bar side, but, because of the bulkiness of the torsion bars, has the disadvantage of an unproductive manufacturing method which leads to high manufacturing costs. Moreover, torsion bars provided in this way with vulcanized-on elastomeric sleeves are susceptible to corrosion as a consequence of the method used.

Finally, for sleeve bearings with a similar technical problem, but with smaller and less bulky components, it is also already known to insert the two mutually concentric connecting parts of such a bearing, which lie one in the other, into a die, injection-mold around them in a single injection cycle and vulcanize them out, as is the case, for example, with a pendulum support (DE 196 31 893 A1) or with a steering rod on a chassis block (EP 684 404 A1). However, because of the bulkiness of the torsion bars, the use of this method for the manufacture of torsion bar bearings would lead to production costs which, from the outset, would rule out manufacturing torsion bar bearings in this way from an appropriate industrial mass production process.

BRIEF SUMMARY OF THE INVENTION

Proceeding from this prior art, the technical problem on which the invention is based is to provide an economical method for manufacturing torsion bar bearings of the above-mentioned type, which reliably rules out, in the long term, relative movements in the separating plane between the elastomeric sleeve and the connecting elements, even under high bearing load, and consequently leads to "silent" torsion bar bearings with an increased service life.

The invention solves this technical problem by means of a method for the manufacture of torsion bar bearings, more precisely torsion bar shoulder bearings, which has the features mentioned in claim 1.

The method according to the invention, which can be used advantageously not only for the manufacture of shoulder bearings for torsion bars, but, in principle, also for all similarly constructed sleeve bearings, has, in its basic structure, four method steps, namely (i) the manufacture of the spring of the sleeve bearing in the conventional way as an elastomeric molding; (ii) the pretreatment of the surfaces, to be connected to the molding manufactured in method step 1, of the connecting parts consisting of metal or plastic, if appropriate after customary degreasing and etching, by means of a likewise conventional adhesive system, preferably by means of a two-component adhesive system consisting of primer and cover; (iii) the pushing of the molding onto the pretreated surface of the inner connecting part, whether this be a bolt, a solid bar or a sleeve, and insertion of the molding into the outer, more precisely externally surrounding connecting part, in such a way that the elastomeric molding carrying an inner connecting part and an outer connecting part undergoes a prestress in the range of 5 to 10%; it goes without saying, at the same time, that the sequence of connection to the connecting parts may also be reversed, that is to say the molding may first be inserted into the outer sleeve or bearing strap, and only then is the inner connecting element pressed in or shot in; (iv) the then complete full vulcanization of the elastomeric bearing spring in the elastomeric spring molding which, in the assembled bearing, is under prestress.

Embodiments of the invention are the subject-matter of the subclaims.

As result, according to this method, a sleeve bearing is obtained in which the elastomeric spring is vulcanized in and vulcanized on between the inner sleeve and the outer sleeve with an extremely firm integral connection. To that extent, the sleeve bearing manufactured by the method of the invention is identical to the pendulum support known from German preliminary publication DE 196 31 893 A1 mentioned in the introduction, but, as compared with the latter, displays a markedly firmer and permanently firmer tying of the elastomer to the sleeve material by virtue of the adhesive system used in method step 2. This is purely because the adhesion promoter can in each case be selected specifically for the material of the connection piece used in each case.

The actual and essential advantage of a sleeve bearing manufactured by the method of the invention, as compared with the similarly constructed pendulum support bearing according to DE 196 31 893 A1, is, however, that the manufacture of sleeve bearings by the method of the invention necessitates only fractions of the manufacturing costs which have to be extended in order to manufacture the known pendulum support. During the manufacture of the pendulum support according to the prior art, it is necessary to have a large and therefore costly die, into which the connecting parts of the pendulum support are introduced as insertion parts, whilst the elastomeric body enclosing and surrounding these connecting parts is then subsequently produced in a single vulcanizing operation, that is to say injection cycle with subsequent vulcanizing on (DE 196 31 893 A1, column 5, last paragraph). In contrast to this, the elastomeric spring molding can be manufactured, without any insertion parts, from simple and conventional dies, if appropriate even by extrusion. In this case, during the subsequent assembly of the sleeve bearing, only slight prestressing forces need to be employed in order to generate a prestress of usually less than 10%. Again, in contrast to other known methods, in which, during the assembly of a sleeve bearing, prefabricated elastomeric moldings have to be subjected to powerful forces, so that, even when adhesives are used, sufficiently firmly adhering connections can be made between the spring element and the connecting parts.

It is critical for the success of the method of the invention, in method step 1, that, in contrast to customary practice, the elastomeric molding manufactured in the conventional way in the vulcanizing die is not fully vulcanized completely, but is removed from the mold even before this state is reached. Expediently, this is carried out at a time when the elastomer is already vulcanized to an extent such that the elastomer matrix no longer has any bubbles. The vulcanizing die required for carrying out the method according to the invention may therefore not only be made smaller and simpler, but, by virtue of the smaller moldings which remain without insertion parts and, moreover, do not need to be fully vulcanized completely, makes it possible to have substantially shorter cycle times than are necessary, for example, for manufacturing a pendulum support with insertion parts according to the prior art. This advantage is preserved even up to the end of the manufacturing method according to the invention, since the final and complete full vulcanization of the sleeve bearing, which concludes after method step 4, no longer takes place in a costly and complicated vulcanizing die, but in simple tempering oils, usually a once-through tunnel furnace, that is to say at minimal costs. This concluding curing in the tempering furnace is carried out preferably in a temperature range from approximately 120° C. to 150° C. and, as a rule, will require dwell times in the region of approximately 30 minutes. Test practice has shown that, for common torsion bar bearing springs, dwell times of approximately 20 to 40 minutes are sufficient for complete curing.

BRIEF DESCRIPTIONS OF THE SEVERAL VIEWS OF THE DRAWING

Figure 2:
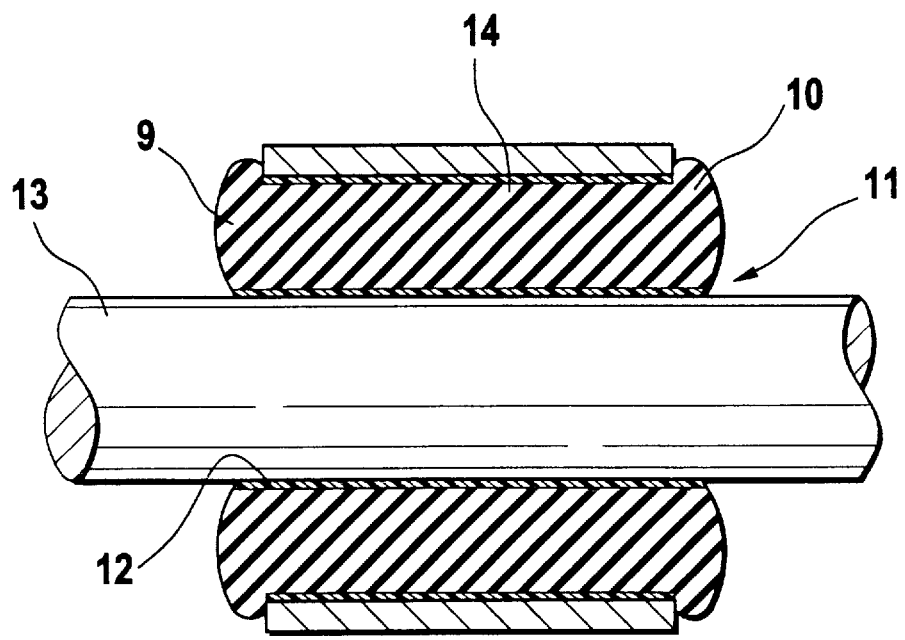

The invention is explained in more detail below with reference to exemplary embodiments, in conjunction with the drawing in which:

FIG. 1 shows, in axial section, a sleeve bearing manufactured by the method of the invention; and FIG. 2 shows, likewise in axial section, a torsion bar shoulder bearing manufactured by the method of the invention, for stabilizing the tilt of a motor vehicle.

In order to manufacture the sleeve bearing shown in FIG. 1, first a sleeve-shaped or packing-like spring element 1 is manufactured in a conventional vulcanizing die. The molding is, in this case, dimensioned and configured in such a way that, after removal from the mold, it has, in the unbraced state, an outside diameter which is slightly larger than the clear inside diameter of the outer connecting sleeve 2 of the sleeve bearing. Moreover, the cylindrical molding, in the unbraced state removed from the mold, has, on both end faces, a shallow continuous annular groove 3 which is dimensioned in such a way that, after the not yet fully vulcanized molding 1 has been clamped into the outer connecting sleeve 2, essentially planar end faces 4 are obtained.

After the prestressing insertion of the not yet fully vulcanized elastomeric molding 1 into the outer connecting sleeve 2, an inner metal sleeve 5 is pressed into a preformed continuous central bore 6 of the elastomeric molding 1. In this case, the inside diameter of the bore 6 is dimensioned in such a way that it has an effective clear dimension after the molding 1 has been clamped into the outer connecting sleeve, that said inside diameter has a dimension smaller than that of the outside diameter of the inner connecting sleeve 5, and that, in the assembled state of the bearing, as shown in FIG. 1, the elastomer of the molding 1 has a prestress in the range of 5 to 10%, and the end-face grooves 3 form an at least approximately planar annular surface 4.

All those surfaces of the connecting parts 2, 5 which are in contact with the clamped elastomeric molding 1 are previously covered with a commercially available adhesive system 7 consisting of primer and cover. The elastomeric spring molding of the sleeve bearing assembled in the way illustrated in FIG. 1 is then fully vulcanized completely with a dwell time of 30 minutes in a once-through tempering furnace at 130° C.

The second exemplary embodiment, shown in FIG. 2, of a bearing manufactured by the method of the invention is a typical torsion bar shoulder bearing. The elastomeric spring molding 9 is a molding which is cylindrical in the relaxed state after removal from the mold and which carries annular collar webs 10 integrally formed on its two end faces.

The elastomeric spring molding 9 provided with a central bore 11 which is underdimensioned in the relaxed state is then pushed onto that portion of a torsion bar 13 which is coated with the adhesive system 12, the central bore 11 at the same time being widened in a prestressing manner. A bearing strap 14 is subsequently tension-mounted, likewise in a prestressing manner, onto the cylindrical outer surface of the molding 9, that surface of the bearing strap 14 which is in contact with the elastomeric molding also being coated with the adhesive system 12.

The torsion bar shoulder bearing obtained and assembled in this way and illustrated in FIG. 2 is then led through a tempering furnace for 40 minutes at 125° C. for the final full vulcanization of the elastomeric molding 9. As compared with the state of the bearing shown in FIG. 2, the fully vulcanized bearing exhibits virtually no changes in configuration.

In contrast to the exemplary embodiment, shown in FIG. 1, of a sleeve bearing which is capable of versatile use and in which the prestressing deformations have previously been taken into account by being compensated by a corresponding configuration of the elastomeric molding, such a correction were in the shown in FIG. 2, such a correction has been dispensed with in the exemplary embodiment of a torsion bar shoulder bearing, as shown in FIG. 2. As result, in the case of a prestress in the region of well below 15%, preferably in the region of around or a little below 10%, the deformation contours shown (not true to scale) in FIG. 2 and brought about by the prestress are obtained. This makes it possible, for example, to fix the shoulder bearing shown in FIG. 2 axially by means of shims or collared washers, without a solid-borne sound bridge from the torsion bar 13 to the bearing strap 14 occurring due to these structural elements.

What is claimed is:

1. Method for manufacturing a sleeve bearing with a sleeve-shaped elastomeric spring between an outer connecting a bearing strap and an inner connecting sleeve coaxial thereto or an inner connecting bolt, characterized by the following method steps:

(A) starting the manufacture of the elastomeric spring as an elastomeric molding, elastomer/metal molding or elastomer/plastic molding in a vulcanizing die mold;

(B) removing the molding from the mold when it is cross-linked so as to be free of bubbles and before it is fully and completely vulcanized so that the molding has free vulcanization valances;

(C) pretreating surfaces of connecting parts to be connected to the molding with an adhesive;

(D) pushing the molding onto an inner connecting part and inserting the molding into an outer connecting part and clamping the molding under moderate prestress between the inner and outer connecting parts; and (E) completing the vulcanization of the elastomeric spring molding, which is under prestress, to become part of the sleeve bearing.

2. Method according to claim 1 characterized by removing the molding from the die-mold, the elastomer having 10 to 25% free vulcanization valences.

3. Method according to one of the claims 1 or 2 characterized by pretreating surfaces of connecting parts is with a two component adhesive.

4. Method according to one of the claims 1 or 2 characterized by completing the vulcanization under a prestress of the elastomeric spring of 5 to 10%.

5. Method according to one of the claims 1 or 2 characterized by completing the vulcanization at a temperature in the range of 120° C. to 150° C.

6. Method according to one of the claims 1 or 2 characterized by completing the vulcanization of the bearing in a tempering furnace.

7. Method according to claim 2 characterized by pretreating the surfaces of connecting parts is with a two component adhesive consisting of a primer and a cover.

8. Method according to claim 7 characterized by completing the vulcanization under a prestress of the elastomeric spring of 5 to 10%.

9. Method according to one of the claims 7 or 8 characterized by completing the vulcanization at a temperature in the range of 120° C. to 150° C.

10. Method according to one of the claims 7 or 8 characterized by completing the vulcanization of the bearing in a tempering furnace.

11. Method for manufacturing a torsion bar shoulder bearing for motor vehicles, with a sleeve-shaped elastomeric spring between an outer bearing strap or an outer bearing lug and an inner shoulder portion of a torsion bar coaxial thereto, characterized by the following method steps:

(A) starting the manufacture of the elastomeric spring as an elastomeric molding, elastomer/metal molding or elastomer/plastic molding in a vulcanizing die-mold;

(B) removing the molding from the mold when it is cross-linked so as to be free of bubbles and before it is fully and completely vulcanized so that the molding has free vulcanization valences;

(C) pretreating surfaces of connecting parts to be connected to the molding with a two component adhesive;

(D) pushing the molding onto a pretreated shoulder portion of the torsion bar and inserting the elastomeric molding slipped onto the torsion bar into an outer bearing strap or into an outer bearing lug, and clamping the molding under moderate prestress; and (E) completing the vulcanization of the elastomeric spring molding, which is under prestress, to become part of the torsion bar shoulder bearing.

12. Method according to claim 11 characterized by removing the molding from the die-mold, the elastomer having 10 to 25% free vulcanization valences.

13. Method according to one of the claims 11 or 12 characterized by pretreating surfaces of connecting parts is with a two component adhesive.

14. Method according to one of the claims 11 or 12 characterized by completing the vulcanization under a prestress of the elastomeric spring of 5 to 10%.

15. Method according to one of the claims 11 or 12 characterized by completing the vulcanization at a temperature in the range of 120° C. to 150° C.

16. Method according to one of the claims 11 or 12 characterized by completing the vulcanization of the bearing in a tempering furnace.

17. Method according to claim 12 characterized by pretreating the surfaces of connecting parts is with a two component adhesive consisting of a primer and a cover.

18. Method according to claim 17 characterized by completing the vulcanization under a prestress of the elastomeric spring of 5 to 10%.

19. Method according to one of the claims 17 or 18 characterized by completing the vulcanization at a temperature in the range of 120° C. to 150° C.

20. Method according to one of the claims 17 or 18 characterized by completing the vulcanization of the bearing in a tempering furnace.

* * * * *